(12) United States Patent
Piercey, III

(10) Patent No.: US 6,474,674 B2
(45) Date of Patent: Nov. 5, 2002

(54) HITCH

(75) Inventor: Gerald S. Piercey, III, Glendale, AZ (US)

(73) Assignee: Mountain Master Sales, LLC, Phoenix, AZ (US)

( * ) Notice: Subject to any disclaimer, the term of this patent is extended or adjusted under 35 U.S.C. 154(b) by 0 days.

(21) Appl. No.: 09/777,754

(22) Filed: Feb. 6, 2001

(65) Prior Publication Data

US 2001/0035629 A1 Nov. 1, 2001

Related U.S. Application Data

(60) Provisional application No. 60/189,717, filed on Mar. 15, 2000.

(51) Int. Cl.[7] .............................................. B62D 53/06
(52) U.S. Cl. ..................... 280/441; 280/484; 280/487
(58) Field of Search ................................ 280/483–487, 280/506, 438.1, 439, 441, 492

(56) References Cited

U.S. PATENT DOCUMENTS

| | | | |
|---|---|---|---|
| 2,093,761 A | | 9/1937 | Kramer |
| 2,193,744 A | | 3/1940 | Shriver |
| 2,391,372 A | * | 12/1945 | Weigand .................. 280/438.1 |
| 3,208,770 A | | 9/1965 | Freitas et al. |
| 3,380,758 A | * | 4/1968 | Granning ................. 280/438.1 |
| 4,279,430 A | * | 7/1981 | Tagg et al. ................. 280/439 |
| 4,580,806 A | | 4/1986 | Kolstad et al. |
| 4,861,060 A | | 8/1989 | Schult et al. |
| 5,226,675 A | | 7/1993 | Noah et al. |
| 5,328,198 A | | 7/1994 | Adams |
| 5,346,240 A | * | 9/1994 | Pettit ........................ 280/438.1 |
| 5,449,191 A | * | 9/1995 | Cattau ........................ 280/441 |
| 5,639,106 A | | 6/1997 | Vitale et al. |
| 5,765,849 A | * | 6/1998 | Moulton et al. ............ 280/441 |
| 5,772,229 A | * | 6/1998 | Cattau ........................ 280/441 |
| 5,785,341 A | | 7/1998 | Fenton |
| 6,135,483 A | * | 10/2000 | Metz ........................... 280/439 |
| 6,170,849 B1 | * | 1/2001 | McCall ..................... 280/438.1 |
| 6,170,850 B1 | * | 1/2001 | Works ...................... 280/438.1 |
| 6,170,851 B1 | * | 1/2001 | Lindenmann et al. .... 280/438.1 |

* cited by examiner

Primary Examiner—Kevin Hurley
Assistant Examiner—Matthew Luby
(74) Attorney, Agent, or Firm—Gallagher & Kennedy, P.A.; Thomas D. MacBlain

(57) ABSTRACT

A hitch apparatus for removably coupling a trailer to a tow vehicle provides fore and aft cushioning, vertical cushioning and roll accommodation. When it is mounted on the tow vehicle, a mounting assembly is situate in the truck bed of the tow vehicle and includes a pair of rails pivotally coupled at a first end with the truck bed. A carriage is mounted on the rails by means of a pair of rail guides, each of which slidably receives a corresponding one of the rails, and is thus slidable in directions fore and aft on the tow vehicle. A shock absorber is pivotally, diagonally coupled between the truck bed, at one end, and the lower surface of the carriage at the other end. A cradle is pivotally mounted for side-to-side rocking within the carriage. A hitch adapted to receive the trailer is mounted to the cradle. A first plate is mounted to the second ends of the rails. An air bag is mounted to the truck bed directly underneath the first plate to provide vertical cushioning. A second plate is mounted to the truck bed directly above the first plate to limit upward pivotal movement of the rails, carriage, cradle and hitch.

19 Claims, 5 Drawing Sheets

HITCH

The present application claims priority rights based on U.S. Provisional Application Serial No. 60/189,717 filed Mar. 15, 2000.

FIELD OF THE INVENTION

The present invention relates generally to a suspension system for a hitch mounted to connect a towing vehicle to a trailer.

BACKGROUND OF THE INVENTION

Most current hitch assemblies merely provide a rigid interconnection between a tow vehicle, such as a pick-up truck, and a trailer, such as a camper or horse trailer, without facilitating adjustment to various load conditions of the trailer during travel over the roads. Such an inability to compensate for driving conditions often results in discomfort for the driver and passenger of the tow vehicle as well as excess wear and tear on both the tow vehicle and the trailer.

Specifically, these hitch assemblies lack an effective means by which to cushion shock created in the fore and aft directions by relative acceleration/deceleration between the tow vehicle and the trailer. These hitch assemblies further lack an effective means by which to cushion shock created in a vertical plane by disparities in pitch angle between the tow vehicle and trailer. Finally, these hitch assemblies lack an effective means by which to accommodate relative rolling motion or tilting that occurs between the tow vehicle and trailer caused by the tow vehicle and trailer being driven or parked on uneven pavement or ground.

Various devices are known in the art for securing a trailer to a pickup truck or similar towing vehicle in a towing configuration. U.S. Pat. No. 2,193,744 to Shriver relates to a fifth wheel hitch in which the trailer-mounted assembly is movable fore and aft against the bias of coil springs that absorb sudden acceleration and deceleration. U.S. Pat. No. 2,093,761 to Kramer relates to a hitch wherein coil springs absorb fore and aft movement of a hitch structure. The hitch structure is mounted on the tow vehicle. These two patents do not contemplate fore and aft cushioning, vertical cushioning or roll accommodation.

U.S. Pat. Nos. 4,861,060 and 4,961,564 to Schult et al. disclose a cushioning air bag in a fifth wheel. The thin air bag 38 is in pneumatic communication with the interior of framing tubes 43 and 44 (best seen in FIG. 6), which interiors serve as the reservoir for the pneumatic air bag. U.S. Pat. No. 5,639,106 to Vitale et al. discloses cushioning air bags in FIGS. 1 and 7. In FIG. 1, four air bags 32 are employed to support the upper structure of the hitch. In the FIG. 7 embodiment of Vitale et al., the two cushioning air bags 57 separate a pivotally connected upper structure, the bags being located between the structure and lower fixed structure at an end of the pivotal structure remote from the pivot. U.S. Pat. No. 5,785,341 to Fenton discloses both a cushioning air bag and a shock absorber disposed intermediate pivotally connected upper and lower structures of the hitch as illustrated in FIGS. 1(a), 2, 3, 4 and 5 of that patent. U.S. Pat. No. 5,328,198 to Adams discloses both a cushioning air bag 15 and a shock absorber 38 located between a pivotal upper portion of the hitch and the lower fixed structure. An elastic band 44 limits the upper movement of the upper pivotal member. U.S. Pat. No. 5,226,675 to Noah et al. discloses an active hitch structure in which sensors detect changes in vertical force to effect pneumatic activation of an air bag 42 as shown in FIG. 3. U.S. Pat. No. 4,580,806 to Kolstad et al. discloses a pivotal upper hitch structure cushioned by an air bag and having a connected shock absorber absorbing vertical acceleration shock of the pivotal upper structure. U.S. Pat. No. 3,208,770 to Freitas et al. discloses a fifth wheel pneumatically cushioned hitch. These patents do not contemplate fore and aft cushioning or roll accommodation.

Accordingly, what is needed in the art is a hitch apparatus that provides fore and aft cushioning, vertical cushioning and roll accommodation as a comprehensive means of improving occupant reducing wear and tear on both the tow vehicle and trailer.

Use of an airbag to cushion a hitch is known. However, without some restraint against hitch supporting structure moving away from the supporting structure under the influence of the air bag, the hitch can be broken during unhitching of a trailer if the airbag is not first deflated. Also, without such restraint, in the event of an accident, a hitch with its supporting structure pivotally connected to the tow vehicle can swing upward and can release the trailer to continue forward to impact the cab of the tow vehicle.

In addition to improved hitch performance and safety, it would be desirable if, upon removal of the uppermost, coupling portion of a hitch, a flat truckbed was left to carry a load.

SUMMARY OF THE INVENTION

According to principles of the present invention, a hitch apparatus for removably coupling a trailer to a tow vehicle provides fore and aft cushioning, vertical cushioning and roll accommodation.

In a preferred embodiment, the apparatus comprises a pivotal mount, a carriage slidably secured to the mount and a rockable cradle on the carriage. A mounting assembly for the hitch includes a pair of rails. Each rail is pivotally coupled at a first end with the mounting structure for securing the apparatus to a truck bed or to the trailer. The carriage is mounted on the rails by means of a pair of rail guides, each of which is slidably received on a corresponding one of the rails and is thus slidable in directions fore and aft relative to the tow vehicle and trailer. One or more diagonally extending shock absorbers are pivotally coupled at one end with the truck bed or the trailer on which the apparatus is mounted and pivotally coupled at the other end with the carriage. The cradle is pivotally coupled with and disposed within the carriage so as to be rockable side to side. The hitch is mounted on the cradle.

A first plate (or other member) is mounted on second ends of the rails remote from their pivotal connection to the mounting structure. An air bag is secured to the truck bed directly underneath the first plate when it is the truck on which the apparatus is mounted. A second, fixed plate (or other member) is located on the truck bed directly above the first plate. This second plate limits the upward pivotal movement of the rails and the hitch supported on the rails. In a preferred embodiment, the rails do not pivot upward beyond the horizontal. The limited upward pivotal movement provided by the second plate limits the degree to which the air bag can raise the hitch in the event that one attempts to unhitch a trailer without first deflating the air bag. Also, this limitation on the pivotal upward movement by the rails supporting the hitch prevents the rails and hitch being raised high above the truck bed and coming uncoupled from the trailer in the event of a collision. The tow vehicle occupants are thus protected from the trailer plowing forward into the cab. Of course, when the apparatus is mounted on the towed trailer, the foregoing vertical relationship of parts is reversed; the air bag is located above the first plate between an overhanging trailer part and the pivoted rails and attached plate. It is downward pivotal movement of the rails that is limited by the second plate.

In one preferred embodiment, the hitch supporting provisions are all located below the upper surface of a truck bed. When the hitch is removed from its supporting members, a flat truck bed is left behind to handle a load.

BRIEF DESCRIPTION OF THE DRAWING

The invention will be better understood from a reading of the following detailed description taken in conjunction with the drawing figures in which like reference designators are used to designate like elements, and in which.

DETAILED DESCRIPTION

Figure 1:
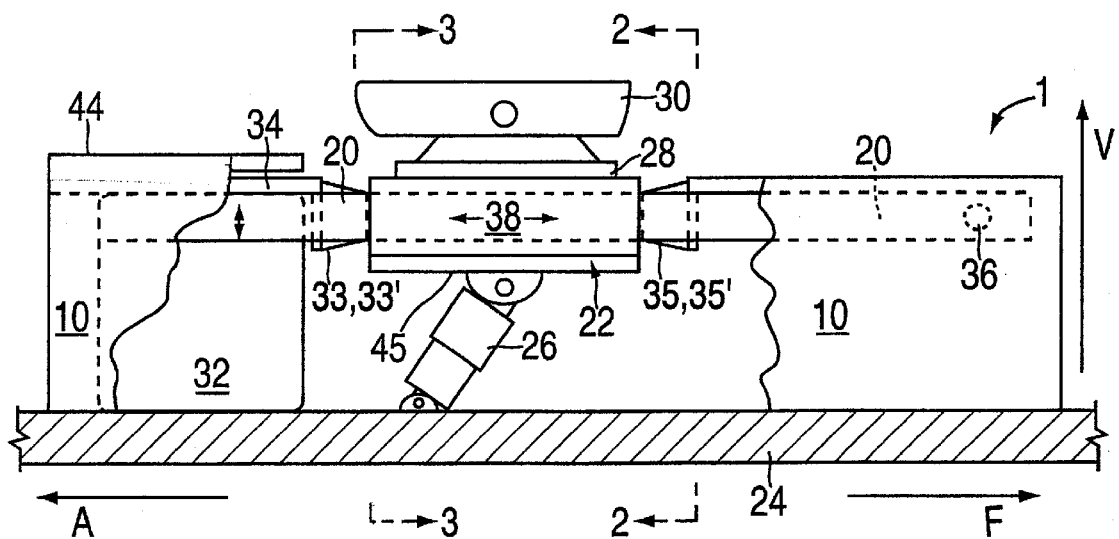
FIG. 1 is a fragmentary side view of an apparatus incorporating features of the present invention.
Figure 2:
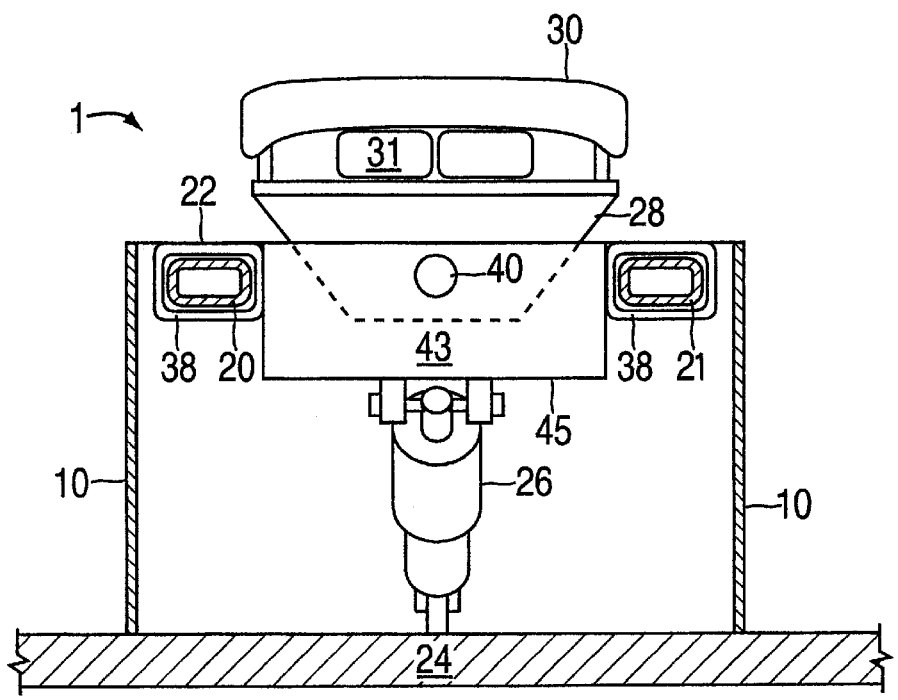
FIG. 2 is a cross-sectional view of the apparatus of FIG. 1 taken along line 2—2.
Figure 3:
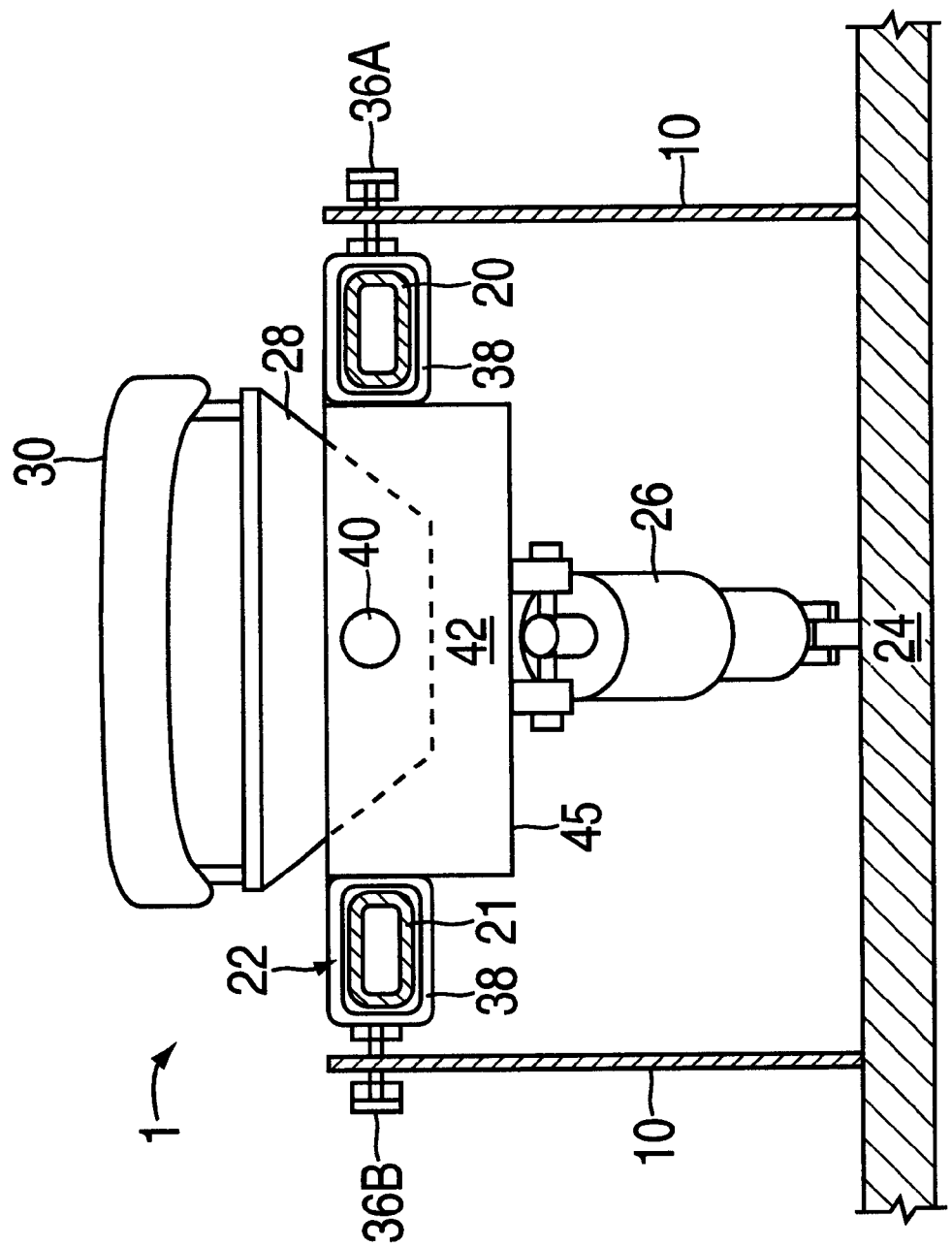
FIG. 3 is a cross-sectional view of the apparatus of FIG. 1 taken along line 3—3.

As shown in FIGS. 1, 2 and 3, a preferred embodiment of an improved hitch assembly 1 incorporating principles of the present invention includes a four-walled frame 10 fixedly mounted on the surface of or within a recess in a tow vehicle truck bed 24. Arrows F and A represent the fore and aft directions in FIG. 1, respectively. As best seen in FIG. 3, a first rail 20 is pivotally mounted to a wall of the frame 10 by a bolt 36A, passing through the frame 10 and the rail 20. A second rail 21 is pivotally mounted to an opposing wall of the frame 10 by a bolt 36B passing through the frame 10 and the rail 21. The rails 20, 21 are thus pivotally connected by the bolts 36A and 36B to the frame 10 and the truck bed 24. A first plate 34 spans and is secured to the rails 20, 21 at their ends remote from the bolts 36A and B.

A slidable carriage 22 having a front plate 42 (FIG. 3), an end plate 43 (FIG. 2) and a lower surface 45 is supported on the rails 20, 21. In FIG. 2, the sliding carriage 22 can be seen to have two rail guides 38, each receiving a corresponding one of the rails 20, 21, shown in section. Accordingly, movement of the carriage 22 is along the rails 20, 21 in the fore and aft direction with respect to the truck bed 24. One of a first pair of rubber or other resilient material bumpers 33, 33' and one of a second pair of like bumpers 35 35' can be seen in FIG. 1. These are mounted in close proximity to or in contact with the front and rear faces of the plates 42 and 43 of one carriage 22, limiting movement of the carriage and cushioning it in the fore and aft directions.

A rocking cradle 28 is disposed within the carriage 22 between the front plate 42 and the end plate 43. The cradle 28 is centrally mounted to the front plate 42 and the end plate 43 by a pivotal connection, such as a bolt 40, extending between the front plate 42 and the end plate 43 and through the cradle 28. A conventional hitch 30 is secured to the cradle 28. The hitch 30 incorporates a clamp 31 adapted to receive a conventional trailer-mounted connector, such as a pin (not shown).

A conventional shock absorber 26 extends diagonally and is pivotally coupled at one end by conventional means to the truck bed 24 and pivotally coupled at the other end by conventional means to the lower surface 45 of the sliding carriage 22. The shock absorber serves as a means to absorb shock imparted to the carriage 22 by the trailer in the fore and aft as well as the vertical direction (indicated in FIG. 1 by arrow V).

An air bag 32 is connected between the bed 24 and a plate 34 to serve as a cushioning means to cushion the plate 34 and, thus, the rails 20, 21 and the supported carriage 22, the cradle 28 and the hitch 30. The air bag 32 preferably has a pneumatic connection to a compressor that can be activated remote from the assembly 1. Upward pivotal movement of the rails 20, 21 is limited by a second plate 44 fixed to the frame 10 above and engageable with the first plate 34.

In operation, the hitch 30 receives the trailer-mounted connector to enable towing by the tow vehicle. Carriage 22 allows limited fore and aft movement of the hitch 30 along rails 20, 21 during acceleration/deceleration of tow vehicle. The shock absorber 26 prevents damaging rapid acceleration (or jerking) of the hitch 30 in the fore and aft directions. Pivoting of the rails 20, 21 about the bolts 36A, 36B allows limited vertical movement of hitch 30 relative to the truck bed 24 during towing periods in which the respective surfaces upon which the tow vehicle and the trailer are situated differ in elevation. The air bag 32, by applying upward pressure upon the plate 34, and the shock absorber 26, by applying pressure upon the lower surface 45, combine to prevent damaging rapid acceleration (or jolting) of the hitch 30 in the vertical direction. The cradle 28 allows limited rolling movement of the hitch 30 during periods of travel over uneven pavement or otherwise irregular terrain, thereby reducing or preventing damaging torsional forces imparted to the tow vehicle and trailer.

Figure 4:
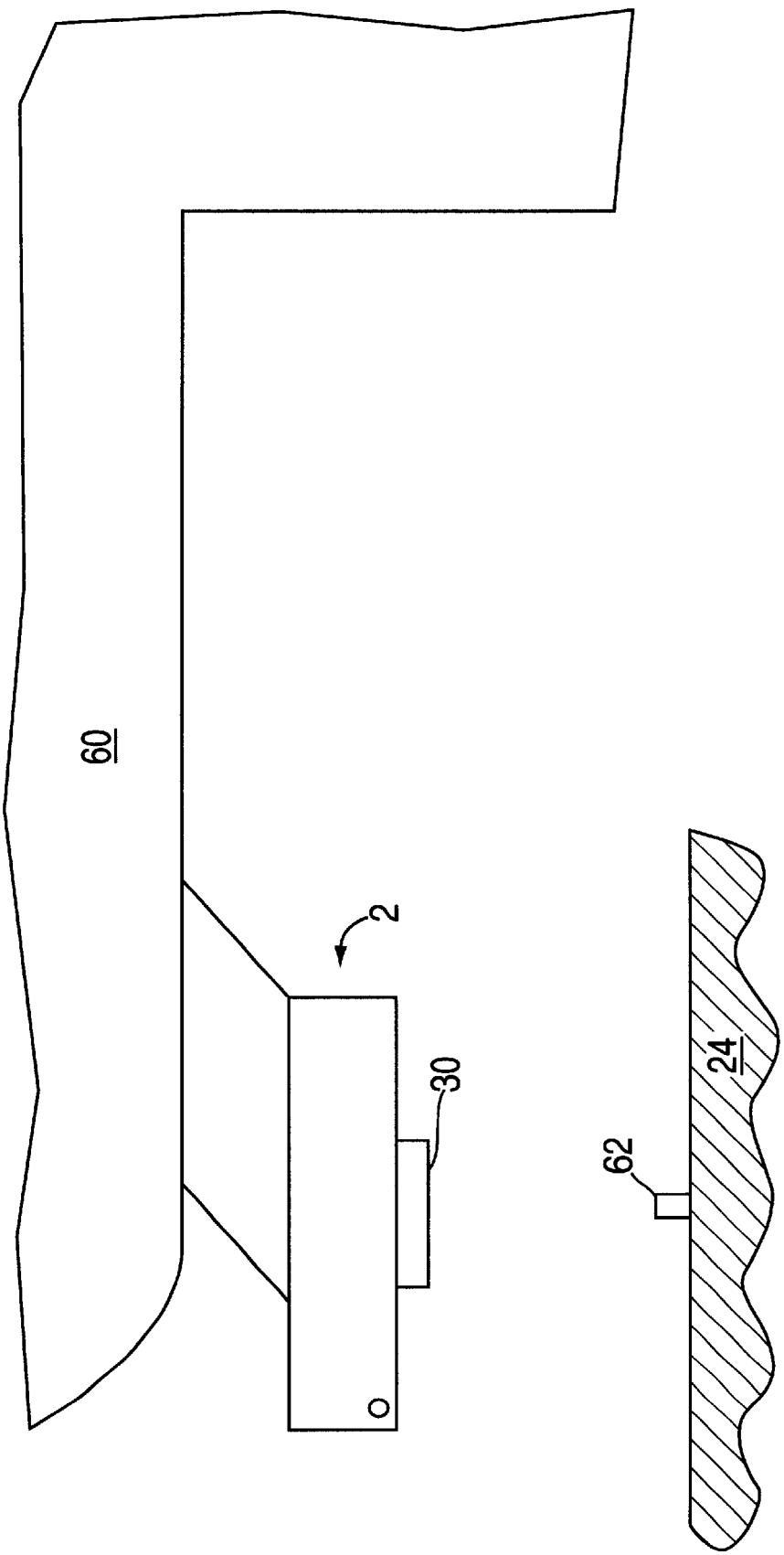
FIG. 4 is a side plan view of a tow vehicle and trailer arrangement incorporating a first alternative embodiment of the present invention.

In an alternative embodiment, best shown in FIG. 4, a hitch apparatus 2, functionally identical to the hitch apparatus 1, is fixed to a trailer 60 instead of to the towing vehicle 24. Accordingly, the hitch 30 of the apparatus 1 may be coupled with a conventional trailer-connecting mechanism known in the art, such as a pin 62, attached to the towing vehicle 24. In such manner, the trailer 60 may be towed by the towing vehicle 24 with all the attendant functional advantages contemplated by the preferred embodiment discussed above.

Figure 5:
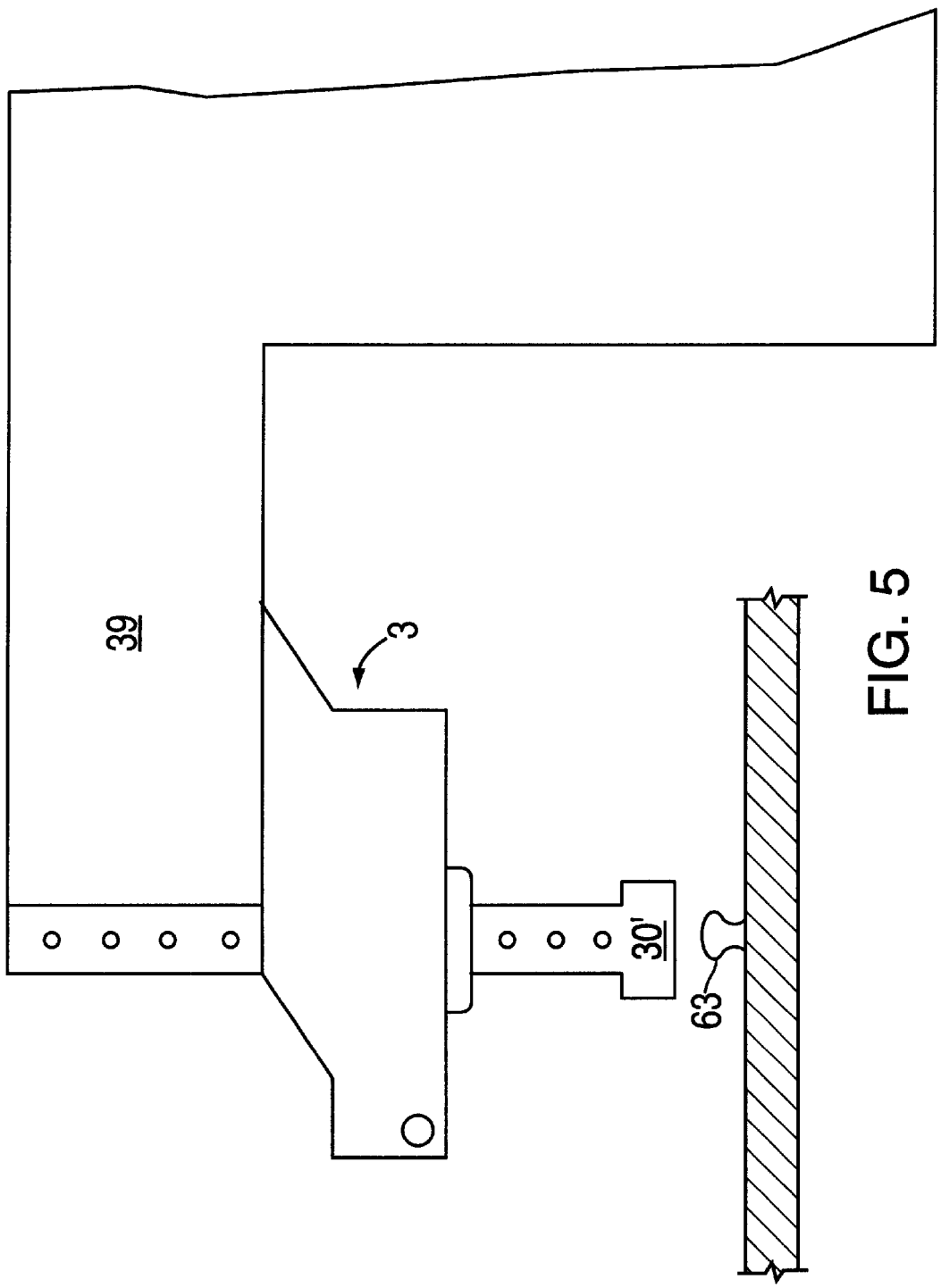
FIG. 5 is a side plan view of a tow vehicle and trailer arrangement incorporating a second alternative embodiment of the present invention.

In a second alternative embodiment, shown in FIG. 5 in relation to a truck bed 24' and a goose neck trailer 39, a hitch 30' of a hitch apparatus 3, comprises a socket rather than a clamp and is adapted to couple with a conventional ball-type coupler 63 thereby forming a conventional ball and socket connection. In such case, hitch 30' is attached directly to the carriage 22, and the cradle 28 is omitted from apparatus 3. In all other respects, the hitch apparatus 3 is functionally identical to the hitch apparatus 1.

Figure 6:
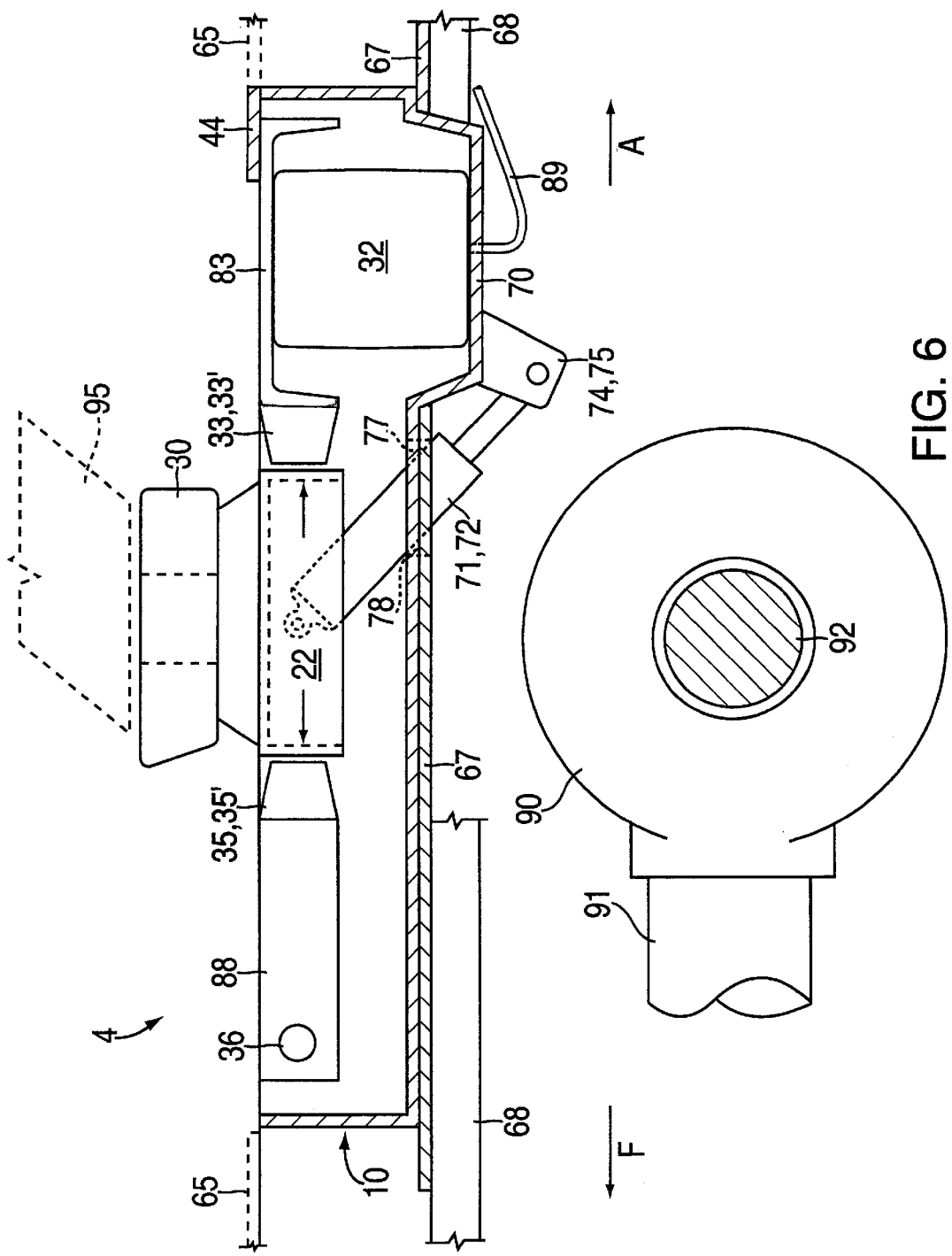
FIG. 6 is a fragmentary side view, partially in section, of a hitch mounting apparatus located below the upper surface of a truck bed.

In FIG. 6, a hitch mounting apparatus 4 is illustrated in which major portions of the mounting apparatus are located below the upper surface 65 of a truck bed. Removal of the hitch 30 leaves a flat truck bed behind for accommodation of a load. A plate 67 spans truck rails 68, one of which appears in FIG. 6. A cutout in the plate 67 accommodates a channel 70 on which the air bag 32 rests. A pair of shock absorbers 71 and 72, only of which can be seen in FIG. 6, extends diagonally from a pair of plates 74, 75 affixed to the channel 70 through openings 77 and 78 in the frame 10 and the plate 67 to the carriage 22. The carriage 22 is slidably supported as in the embodiment of FIG. 1. As in the FIG. 1 embodiment, a pair of rubber or other resilient material bumpers 33, 33' are fixed to a channel 83 supported on the air bag 32, and a second pair of such bumpers 35, 35' are supported on a member 88 that forms a part of the pivoted rail assembly described in relation to FIG. 1. The bumpers 33, 33' and 35, 35' are supported in close proximity to or in engagement with the slidable carriage 22.

Again, the plate 44 limits upward pivotable movement of the pivoted hitch support provisions. An air line 89 is shown that permits remote adjustment of the air bag 32 from a compressor. Again, arrows labeled A and F indicate the aft and fore directions in FIG. 6. For orientation, the apparatus 4 is shown in relation to the tow vehicle's differential 90, its drive shaft 91 and axle 92. The trailer hitch connector is shown in broken lines at 95.

Although the invention has been described in terms of the illustrative embodiment, it will be appreciated by those skilled in the art that various changes and modifications may be made to the illustrative embodiment without departing from the spirit or scope of the invention. For example, the rails 20, 21 and the plate 44 may alternatively be pivotally secured to a truck bed through means other than the frame 10. It is intended that the scope of the invention not be limited in any way to the illustrative embodiment shown and described but that the invention be limited only by the claims appended hereto.

What is claimed is:

1. An apparatus for removably coupling a trailer to a towing vehicle, said apparatus comprising:
   a mounting assembly mounted on the towing vehicle;
   a carriage mounted on said assembly, said carriage further comprising first and second ends;
   a cradle pivotally coupled with and disposed between said first and second ends, said cradle being pivotable about an axis extending generally in the direction of travel of the vehicle;
   a hitch fixedly mounted to said cradle, said hitch adapted to couple to the trailer;
   said mounting assembly comprising at least one rail having first and second ends, said first end being pivotally coupled with the towing vehicle; and
   said carriage further comprises at least one rail guide, said at least one rail guide adapted to slidably receive said at least one rail, said carriage during towing being slidable on said at least one rail in directions fore and at relative to the towing vehicle.

2. The apparatus of claim 1, further comprising a first plate fixedly mounted to said second end of said at least one rail.

3. The apparatus of claim 2, further comprising means for cushioning fixedly mounted with respect to said towing vehicle, said means for cushioning disposed below and in operative engagement with said first plate.

4. The apparatus of claim 2, further comprising a second plate fixedly mounted with respect to said towing vehicle, said second plate disposed above said first plate to limit upward movement of the first plate, the at least one rail, the carriage, the cradle and the hitch.

5. The apparatus of claim 3, wherein said means for cushioning comprises an air bag.

6. The apparatus according to claim 5, wherein the air bag is connected between a point fixed with respect to the towing vehicle and the first plate, at a location remote from a pivotal connection of the at least one rail with the towing vehicle.

7. An apparatus for removably coupling a trailer to a towing vehicle, said apparatus comprising:
   a mounting assembly mounted on the towing vehicle;
   a carriage mounted on said assembly, said carriage further comprising first and second ends;
   a cradle pivotally coupled with and disposed between said first and second ends, said cradle being pivotable about an axis extending generally in the direction of travel of the vehicle;
   a hitch fixedly mounted to said cradle, said hitch adapted to couple to the trailer;
   said mounting assembly comprising at least one rail having first and second ends, said first end being pivotally coupled with the towing vehicle; and
   said apparatus further comprising at least one shock absorber having first and second ends, said shock absorber pivotally coupled with the towing vehicle at said first end of said shock absorber, said shock absorber pivotally coupled with said carriage at said second end of said shock absorber, said carriage mounted for pivotal upward and downward movement with the at least one rail during towing and for movement fore and aft relative to the at least one rail during towing, said shock absorber adapted to impart shock absorption to said carriage in directions fore, aft and vertical relative to the towing vehicle.

8. The apparatus of claim 7, wherein said at least one shock absorber extends diagonally from the carriage to a point fixed with respect to the towing vehicle.

9. An apparatus for removably coupling a trailer to a towing vehicle, said apparatus comprising:
   first and second rails each having first and second ends, said first ends of said first and second rails pivotally coupled with the towing vehicle;
   a carriage comprising first and second rail guides slidably received on said first and second rails to allow sliding movement of the carriage fore and aft on the rails during towing, said rails extending and said carriage being slidable in directions fore and aft relative to the towing vehicle;
   a shock absorber having first and second ends, said shock absorber pivotally coupled with the towing vehicle at its first end, said shock absorber pivotally coupled with said carriage at its second end, said shock absorber situated to absorb forces applied in directions fore, aft and vertical relative to the towing vehicle; and
   a hitch mounted to said carriage, said hitch adapted to receive the trailer.

10. The apparatus of claim 9, said apparatus further comprising a cradle pivotally coupled with said carriage for side-to-side rocking movement about an axis generally extending fore and aft of the towing vehicle.

11. The apparatus of claim 10, wherein said hitch is fixedly mounted to said cradle.

12. The apparatus of claim 9, further comprising a member fixedly mounted to said second ends of said rails remote from the pivotal coupling of the rails with the towing vehicle.

13. The apparatus of claim 12, further comprising an air bag connected between a point fixed with respect to the towing vehicle and said member fixedly mounted to said second ends of said rails.

14. The apparatus of claim 12, further comprising a plate fixedly mounted to said towing vehicle, said plate disposed above said member and limiting upward pivotal movement of the rails.

15. The apparatus of claim 14, further comprising resilient bumpers mounted proximate the carriage limiting fore and aft sliding of the carriage.

16. The apparatus according to claim 9, wherein only the hitch protrudes above an upper deck surface of the towing vehicle, said hitch being removably mounted, whereby, upon removal of the hitch, a flat truck bed remains.

17. An apparatus for removably coupling a trailer to a towing vehicle, said apparatus comprising:

first and second rails each having first and second ends, said first ends of said rails being adapted to be pivotally coupled with one of the towing vehicle and the trailer;

a carriage comprising first and second rail guides carrying a member for connection to a hitch, said first and second rail guides adapted to slidably receive a corresponding one of said first and second rails, said carriage being slidable during towing along said rails in directions fore and aft relative to the towing vehicle and trailer;

at least one shock absorber comprising first and second ends, said shock absorber adapted to be pivotally coupled with a point fixed with respect to said one of the towing vehicle and trailer at said first end, said shock absorber pivotally coupled with said carriage at said second end, said shock absorber adapted to absorb forces applied in fore and aft directions between the towing vehicle and the trailer;

an air bag fixedly adapted for mounting between said one of the towing vehicle and trailer and said rails in cushioning relation to the rails;

means for limiting the pivotal movement of the second rail ends away from said one of the towing vehicle and trailer; and means for limiting fore and aft sliding of the carriage.

18. The apparatus according to claim 17, wherein said apparatus is adapted for mounting on the trailer, and said one of the towing vehicle and the trailer being the trailer.

19. The apparatus of claim 18, wherein the member for connection to a hitch comprises a cradle pivotally mounted on said carriage, said cradle being pivotable on an axis extending substantially fore and aft said hitch being mounted to said cradle.

* * * * *